United States Patent
Delitz

(10) Patent No.: US 8,827,638 B2
(45) Date of Patent: Sep. 9, 2014

(54) CONNECTION ASSEMBLY FOR JOINING A TURBINE HOUSING AND A BEARING HOUSING AND EXHAUST GAS TURBOCHARGER

(75) Inventor: Joachim Delitz, Heddesbach (DE)

(73) Assignee: iHi Charging Systems International GmbH, Heidelberg (DE)

( * ) Notice: Subject to any disclaimer, the term of this patent is extended or adjusted under 35 U.S.C. 154(b) by 499 days.

(21) Appl. No.: 13/135,885

(22) Filed: Jul. 15, 2011

(65) Prior Publication Data
US 2011/0299983 A1 Dec. 8, 2011

Related U.S. Application Data

(63) Continuation-in-part of application No. PCT/EP2010/000164, filed on Jan. 14, 2010.

(30) Foreign Application Priority Data

Jan. 17, 2009 (DE) .......................... 10 2009 005 013

(51) Int. Cl.
*F01D 25/16* (2006.01)
*F02C 7/24* (2006.01)
*F02C 6/12* (2006.01)

(52) U.S. Cl.
CPC ............. *F02C 7/24* (2013.01); *F05D 2230/642* (2013.01); *F05D 2220/40* (2013.01); *F02C 6/12* (2013.01)
USPC ..................... 415/178; 415/213.1; 415/214.1; 415/204

(58) Field of Classification Search
USPC ........ 415/177, 178, 213.1, 214.1, 215.1, 203, 415/204, 205
See application file for complete search history.

(56) References Cited

U.S. PATENT DOCUMENTS

| | | | |
|---|---|---|---|
| 6,715,288 B1 * | 4/2004 | Engels et al. | 60/602 |
| 6,951,450 B1 * | 10/2005 | Figura et al. | 417/407 |
| 7,946,809 B2 * | 5/2011 | Meier et al. | 415/177 |
| 8,092,162 B2 * | 1/2012 | Masson et al. | 415/177 |

FOREIGN PATENT DOCUMENTS

| | | |
|---|---|---|
| DE | 10005246 | 10/2001 |
| DE | 102007029004 | 12/2008 |
| GB | 2271814 | 4/1994 |
| JP | 1905979 | 4/2008 |
| WO | 2004048755 | 6/2004 |

* cited by examiner

*Primary Examiner* — Ned Landrum
*Assistant Examiner* — Justin Seabe
(74) *Attorney, Agent, or Firm* — Klaus J. Bach

(57) ABSTRACT

In a connection assembly of a turbine housing to a bearing housing of an exhaust gas turbocharger and to an exhaust gas turbocharger, wherein the turbine housing and the bearing housing are centered relative to each other and connected to each other in the region of a connection joint including a sealing assembly with a heat shield disposed between the turbine housing and the bearing housing, at least one cutout is provided in the heat shield for accommodating a centering means by way of which the turbine housing and the bearing housing are directly centered relative to one another.

7 Claims, 3 Drawing Sheets

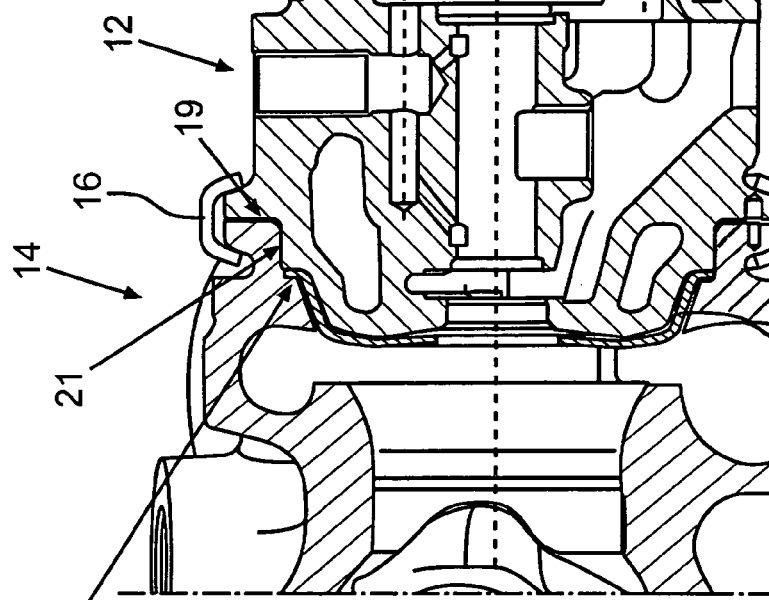
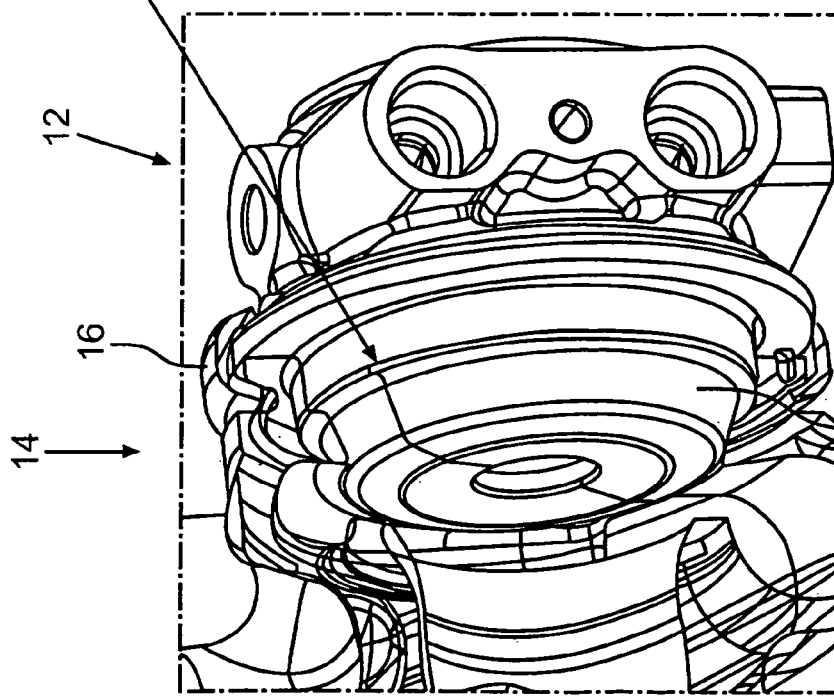
Fig. 1A
Fig. 1B
Prior Art

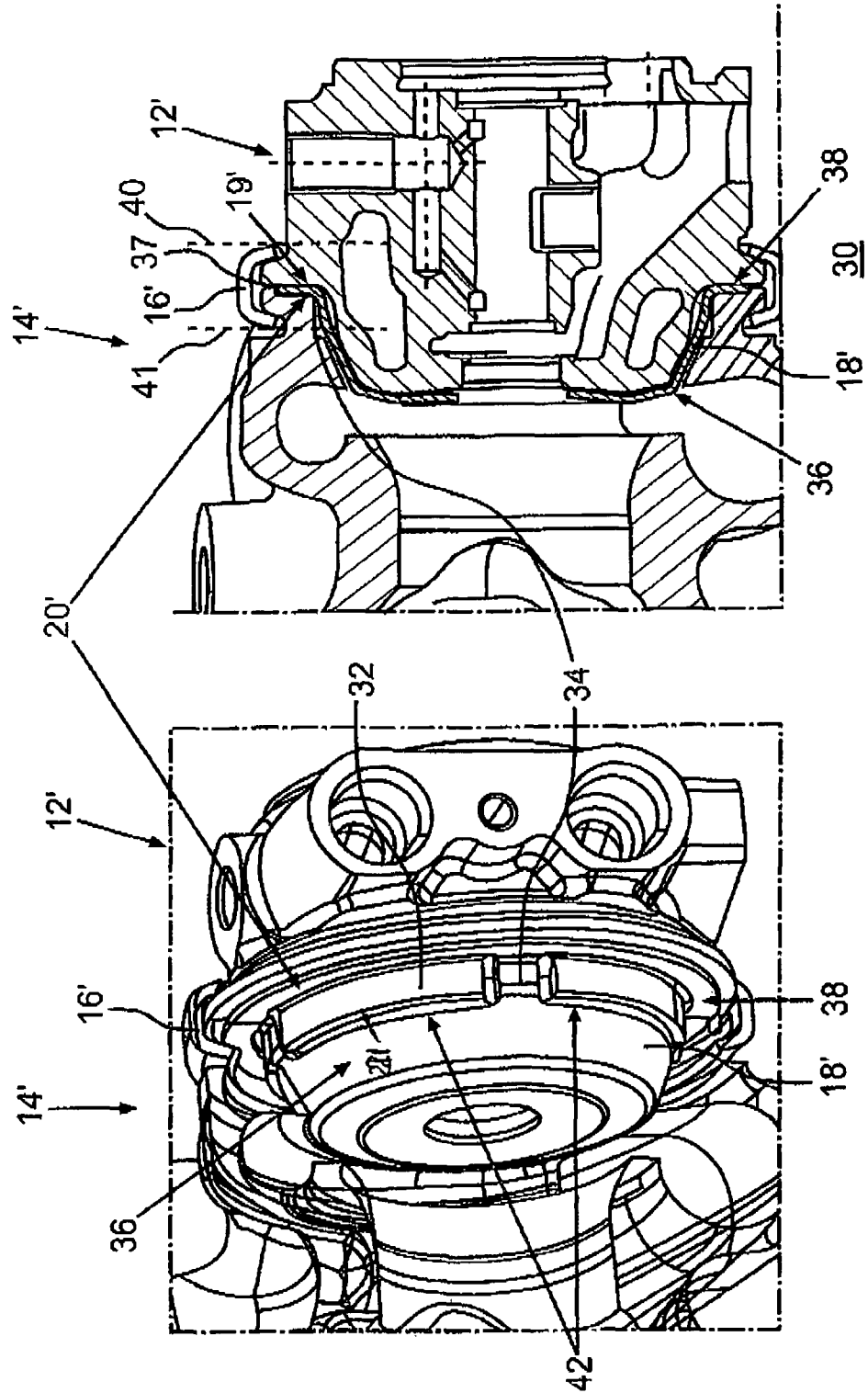

CONNECTION ASSEMBLY FOR JOINING A TURBINE HOUSING AND A BEARING HOUSING AND EXHAUST GAS TURBOCHARGER

This is a Continuation-In-Part application of pending international patent application PCT/EP2010/000164 filed Jan. 14, 2010 and claiming the priority of German patent application 10 2009005 013.2 filed Jan. 17, 2009.

BACKGROUND OF THE INVENTION

The invention relates to a connection assembly of a turbine housing with a bearing housing of an exhaust gas turbocharger and to an exhaust gas turbocharger including such a connection assembly.

Such a connection assembly is already known and is shown in FIG. 1. FIG. 1 shows a known connection assembly 10 of a turbine housing 14 to a bearing housing 12 of an exhaust gas turbocharger. The turbine housing 14 is thereby centered on the bearing housing 12 by means of a centering collar 21.

When connecting the two housings by means of a V collar clamp 16, a connection joint 19 is obtained, which of course needs a seal.

The sealing of the connection joint 19 is realized in such a manner that the turbine housing 14 and the bearing housing 12 form, together with a heat shield 18, a sealing assembly 20, whereby a discharge to the environment of an exhaust gas driving a turbine, not shown, in the turbine housing is prevented.

In FIGS. 1A, 1B, this sealing assembly between the turbine housing 14, the bearing housing 12 and the heat shield 18 is indicated by the reference numeral 20. By means of the shown sealing assembly 20, a positioning of the heat shield 18 is also realized by an axial and radial abutment at the turbine housing 14.

The heat shield 18 further has the purpose to avoid or to at least reduce an excessive heat transfer from the hot exhaust gas flowing through the turbine housing 14 to the bearing housing 12.

Due to the fact that the bearing housing 12 is manufactured of cast iron and the turbine housing 14 consists of steel, the turbine housing has a higher heat expansion coefficient. The disadvantage of the state of the art shown in FIG. 1 is the result of the different heat expansion coefficients causing different heat expansion of the two housings.

Due to the positioning of the heat shield 18 displaced in the axial direction towards the turbine housing 14, whereby the sealing assembly 20 is not arranged centrally with regard to the V collar clamp 16, a gap can occur at extreme temperature differences due to the different heat expansions, which the V collar clamp can only compensate for insufficiently or not at all. The result can be a gas leak, and exhaust gases can pass from the exhaust gas turbocharger to the environment.

The different heat expansions of the housings are further increased in that the turbine housing 14 is heated to a greater degree than the bearing housing 12 due to the in favorable positioning of the heat shield 18.

Furthermore, due to this higher heat entry, the surfaces of the heat shield 18 in contact in the sealing assembly 20 may be warped, which results in a gas leak.

It is the object of the present invention to provide a connection assembly of the above-mentioned type in such a manner that a gas leak is avoided and that a centering of the two housings relative to each other is simultaneously achieved.

SUMMARY OF THE INVENTION

In a connection assembly of a turbine housing to a bearing housing of an exhaust gas turbocharger and to an exhaust gas turbocharger, wherein the turbine housing and the bearing housing are centered relative to each other and connected to each other in the region of a connection joint including a sealing assembly with a heat shield disposed between the turbine housing and the bearing housing, at least one cutout is provided in the heat shield for accommodating a centering means by way of which the turbine housing and the bearing housing are directly centered relative to one another.

Such an arrangement provides for an advantageous positioning of the heat shield and of the sealing arrangement, whereby a gas leak is prevented. Thus, no exhaust gas flowing through the turbine housing and driving a turbine of the exhaust gas charger can escape to the environment without being treated in an exhaust gas aftertreatment system. The exhaust gas is contained in the exhaust gas turbocharger and is passed through a corresponding exhaust gas piping to the exhaust gas aftertreatment system, where it is cleaned and only then flows to the environment via an exhaust pipe.

With a connection assembly according to the invention, it is further possible to center the turbine housing and the bearing housing relative to each other. A better radial alignment of the housings to each other is achieved thereby and a contact of the turbine wheel with the exhaust gas turbocharger housing is prevented.

Preferably, several recesses for a centering means are provided in the heat shield. It is also conceivable that only one recess is provided, which then would have to extend over a relatively large section of the circumference of the heat shield, in order to make a sufficient centering by the centering means possible.

The centering means is preferably a centering collar, wherein the bearing housing and the turbine housing are centered relative to each other according to the invention by means of an outer casing surface of the bearing housing and a corresponding inner casing surface of the turbine housing. Alternative centering means and/or a reversal of the described inner casing surface and the outer casing surface is nevertheless conceivable.

For a very good centering relatively large parts of the outer casing surface and of the inner casing surface should be in contact with each other.

In an advanatgeous embodiment of the connection assembly, the at least one recess of the heat shield is thus formed as a partially circumferential gap in the radial casing surface of the heat shield. As already mentioned, this gap should surround a section of the circumference of the heat shield as large as possible, in order to achieve a very good centering.

In a further advantageous embodiment, the heat shield has several recesses in the form of respectively a partially circumferential gap in its radial casing surface. This is advantageous in that a very good centering of the housings is achieved by these recesses on the one hand, and on the other hand, the heat shield still has a good stability.

The mentioned stability of the heat shield with a simultaneous design of a sealing assembly with a very good sealing effect for preventing a gas leak is realized with the connection assembly according to the invention in such a manner that the heat shield has at least one, in an advantageous embodiment however several connection webs, which connect a base body of the heat shield, which represents a cylindrical part of the heat shield, to a flange-shaped part of the heat shield, wherein the flange-shaped part forms the sealing arrangement with corresponding surfaces of the turbine housing or of the bearing housing.

By means of this arrangement, a very good shielding of the heat from the bearing housing is achieved by the heat shield on the one hand, and a very good sealing effect is achieved on the other hand.

In order to improve these effects of the sealing and shielding further, a defined positioning and/or centering of the heat shield in the turbine housing or in the bearing housing is necessary. This is realized according to the invention by a shoulder of the respective housing, by means of which the heat shield is centered.

By means of the described positioning and centering possibilities of the individual components, an extremely advantageous axial alignment of the components, and particularly of the turbine housing and of the bearing housing is realized in addition to the mentioned advanatgeous radial alignment, whereby the danger of the turbine wheel coming into contact with the housing is lowered further.

In a further advantageous embodiment of the invention, the sealing assembly of the described flange-shaped part of the heat shield and of corresponding surfaces of the turbine housing and bearing housing is arranged within, particularly centrally of a region, which is defined by an axial expansion of a connection device between the bearing housing and the turbine housing in the direction of the bearing housing on the one hand and in the direction of the turbine housing on the other hand.

This connection device is formed for example as a clamp and particularly as a V collar clamp. If the described sealing arrangement is now positioned as described, a gas leak and thus a discharge of uncleaned exhaust gas to the environment is avoided.

The reason for such as gas leak is that the bearing housing is manufactured of a material different from that of the turbine housing. If the bearing housing is for example made of cast iron, and the turbine housing consists of a steel casting, the turbine housing has a higher heat expansion coefficient. This results in that the two housings expand to a different extent, whereby a connection joint between the two connected housings, which should be kept small by means of the connection device, that is, the V collar clamp, will become larger. This occurs to an even greater degree with a heating of the housings to different temperatures.

Due to the described, preferably central, positioning of the sealing arrangement with regard to the connection device, different heat expansions of the housings are avoided, whereby a gas leak and thereby an undesired contamination of the environment is prevented. Simultaneously, a centering of the bearing housing and of the turbine housing relative to each other by recesses in the heat shield is still possible.

Furthermore, a heat shielding of the heat shield from the bearing housing with regard to the turbine housing which is exposed to the hot exhaust gas is clearly improved by the positioning according to the invention, whereby large different heat expansions of the housings do not result in any case, as is for example the case with conventional connection assemblies.

A danger of a warping of the corresponding sealing surfaces in the sealing assembly, resulting in a gas leak, is nevertheless clearly reduced.

The connection assembly according to the invention is thereby not restricted to turbine housings with one flute, but can also be used with turbine housings with several flutes. The use with housing parts of other than the mentioned materials is furthermore possible.

In an advantageous embodiment of the invention, the bearing housing has recesses, which offer a space for the at least one connection bar of the heat shield. The positioning of the heat shield is thereby further influenced in a positive manner.

A further advantageous aspect of the invention is that the costs are only little affected, as all advantageous embodiments can be realized without costintensive and/or additional production steps. It shall be mentioned here that the connection assembly according to the invention can also be used in multi-part housings, particularly bearing housings.

The use of the connection assembly according to the invention in an exhaust gas turbocharger of an internal combustion engine proves to be extremely advantageous, as undesired emissions of uncleaned exhaust gas and thus an additional contamination of the environment, for example by an increased NO emission can be avoided.

Further advantages, characteristics and details of the invention are apparent from the following description of a preferred embodiment on the basis of the accompanying drawings. The characteristics and characteristics combinations mentioned subsequently in the figure description can not only be used in the respectively given combination, but also in other combinations or on their own without leaving the scope of the invention.

BRIEF DESCRIPTION OF THE DRAWINGS

FIG. 1A is a perspective view and FIG. 1B is a longitudinal cross-sectional view of a connection assembly according to the state of the art, FIG. 2A is a perspective view and 2B is a longitudinal cross-sectional view of a connection assembly of a turbine housing and a bearing housing and FIG. 3A is a perspective view and 3B is another longitudinal cross-sectional view of the connection assembly of FIGS. 2A, 2B.

DESCRIPTION OF A PREFERRED EMBODIMENT OF THE INVENTION

Figures 3A, 3B:
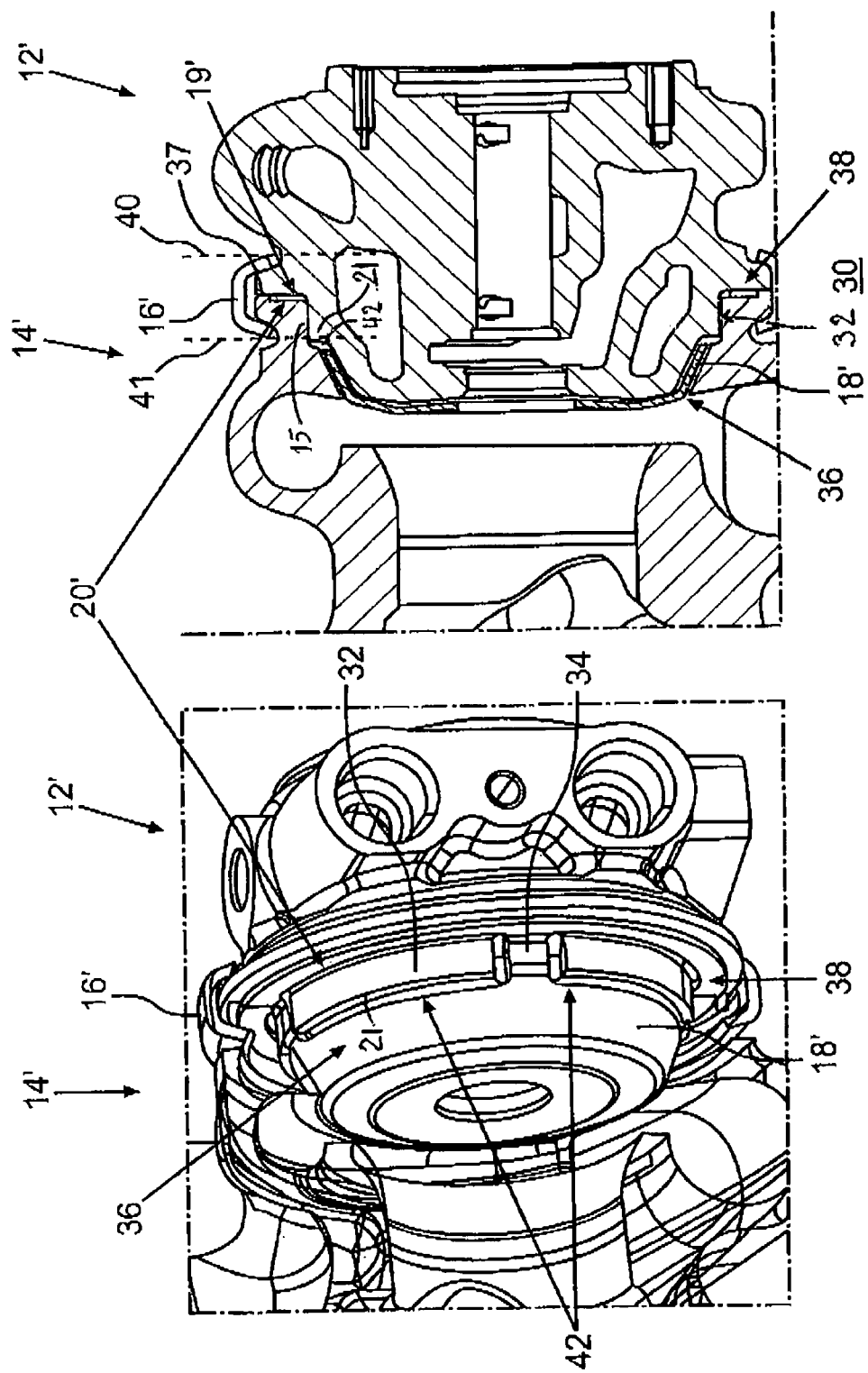

While FIGS. 1A, 1B show a connection assembly of a turbine housing to a bearing housing of an exhaust gas turbocharger according to the state of the art with a heat shield and a sealing assembly of the bearing housing, the turbine housing and the heat shield are positioned adjacent to each other in the axial direction of the turbine housing and thus outside a connection device. FIGS. 2A, 2B slow a connection assembly of a turbine housing to a bearing housing of an exhaust gas turbocharger. The sealing assembly is positioned centered relative to a connection element and thus to the housings. FIGS. 3A, 3B show the connection assembly of FIGS. 2A, 2B, wherein the longitudinal section is shown in a rotationally displaced axial plane of the connection assembly, so that further aspects of the connection assembly of FIGS. 2B and 3B are shown.

FIGS. 2A, 2B show a connection assembly 30, wherein a bearing housing 12' is connected to a turbine housing 14' by means of a connection device in the form of a V collar clamp 16'.

A heat shield 18' is arranged between the bearing housing 12' and the turbine housing 14', which prevents a large amount of heat due to a hot gas flowing through the turbine 14' and driving a turbine wheel, not shown, from being transferred to the bearing housing 12'. This is largely realized by a cylindrical main part 36 of the heat shield 18'.

On the other side, the heat shield 18' forms also a sealing assembly 20' with the bearing housing 12' and the turbine housing 14' via a flange-shaped part 38, which seals a connection joint 19' between the bearing housing 12' and the turbine housing 14', so that the exhaust gas flowing through the turbine housing 14' does not discharge to the environment, but is guided to an exhaust gas aftertreatment system disposed in an exhaust gas tract via a corresponding exhaust gas piping and is cleaned there.

Due to the design of the heat shield 18' shown in FIG. 2, a positioning of the sealing assembly 20' is possible in such a manner that the sealing assembly is arranged centrally in a region, which is defined by an axial extent of the V collar clamp 16' in the direction of the bearing housing 14' on the one hand and in the direction of the turbine housing 12' on the other hand. This described region is illustrated by the lines 40 and 41.

By means of the positioning of the sealing assembly 20' in such a manner, a sealing effect of tis sealing assembly of corresponding sealing surfaces of the heat shield 18', of the bearing housing 12' and of the turbine housing 14' is clearly increased, as different heat expansions of the bearing housing 12' and of the turbine housing 14' due to different materials cannot occur.

The heat shielding of the heat shield 18 is furthermore improved by an enlargement of the cylindrical part 36 of the heat shield 18' that is the heat shield extends over a larger part of the bearing housing 12'.

The radial alignement of the housings is additionally optimized by the connection assembly 30 shown in FIGS. 2A, 2B.

A centering of the bearing housing 12' relative to the turbine housing 14' takes place with the connection assembly 30 of FIGS. 2A, 2B via a centering shoulder sections (21) with centering surfaces 32 of the bearing housing 12' with a corresponding centering surface collar 15 of the turbine housing 14', shown in FIG. 3B. As can be seen, the heat shield 18' has cutouts 42 in the form of partially circumferential gaps in its radial casing surface, that is the cylindrical part 36, through which gaps the shoulders (21) with the centering surfaces 32 extend.

The heat shield 18' has an outer flange-shaped part 38 which is connected to the cylindrical part 36 of the heat shield 18', by connection webs 34, which extend through the respective corresponding recesses or spaces between the centering shoulder section 21 of the bearing housing 12'.

A centering of the heat shield 18' is realized by means of a shoulder 37 of the turbine housing 14' The mentioned components are thus not only fixed optimally axially, but also radially. The radial fixing of the heat shield 18' can alternatively also occur in another manner, for example by a corresponding shoulder or collar formed not in the turbine housing 14', but in the bearing housing 12'.

The centering of the housings is not shown in FIGS. 2A, 2B, as the shown section extends through a connection web 34.

The centering of the bearing housing 12' relative to the turbine housing 14' is shown in FIG. 3A, 3B, in which the longitudinal section extends through a collar section 15 showing the centering surface 32 of the turbine housing 14'.

FIG. 3A and FIG. 3B show the connection assembly 30 of FIG. 2A, 2B, also in a perspective and in a longitudinal sectional view, wherein further aspects of the connection assembly 30 are illustrated for the described guide structure as the section extends in a plane different from that of FIG. 2B.

In the longitudinal section view in FIG. 3B, the centering of the bearing housing 12' relative to the turbine housing 14' via the centering surface 32 of the bearing housing can now be seen, which centering surface is formed as an outer casing surface of the centering sections 21 and which is in contact with a corresponding inner casing surface of the collar section 15 formed by the turbine housing 14'. The centering of both housings thus takes pace via the axially extending shoulder sections 21 which form the centering surface 32 and the centering collar section 15.

The longitudinal section view in FIG. 3B first gives the impression that the heat shield 18' is formed in two parts, wherein one part is represented by the cylindrical part 36 of the heat shield 18' and the second part by the flange-shaped part 38 of the heat shield 18'. This two-part arrangement of the heat shield 18' could be due to the desired centering of the housings with a simlutaneous positioning of the sealing assembly 20' in the center of the region of the V collar clamp 16' limited by the lines 40 and 41.

Only in combination with the longitudinal section view of FIG. 2, it becomes clear that the heat shield 18' is actually a single part and the described positioning can nevertheless be maintained together with the described centering.

This is enabled in the described manner by the cut-outs 42 of the heat shield 18', by the connection webs 34 and by the corresponding recesses at the bearing housing 12' through which the connection webs 34 extend.

What is claimed is:

1. A connection assembly (30) of a turbine housing (14') to a bearing housing (12') of an exhaust gas turbocharger, said turbine housing (14') and said bearing housing (12') being centered relative to each other and connected to each other by a connection joint (19') including a sealing assembly (20'), with a heat shield (18') disposed between said turbine housing (14') and said bearing housing (12'), the heat shield (18') having annularly spaced cutouts (42) through which axially projecting shoulder sections (21) with outer centering surfaces (32) of the bearing housing (12) extend, and the turbine housing (14) having a corresponding annular collar structure (15) with an inner surface in direct contact with the centering surfaces (32) of the shoulder sections (21) projecting axially through the annularly spaced cutouts (42) in the heat shield (18') thereby providing a centering arrangement via which the turbine housing (14') and the bearing housing (12') are in direct centering contact with one another.

2. The connection assembly (30) according to claim 1, wherein the cutouts (42) are in the form of at least partially circumferential gaps (42) in a radial section (36) of the heat shield (18').

3. The connection assembly (30) according to claim 1, wherein the heat shield (18') is centered by means of a shoulder (37) of one of the turbine housing (14') and the bearing housing (12').

4. The connection assembly (30) according to claim 1, wherein the bearing housing (12') and the turbine housing (14') are centered relative to each other by means of an outer casing surface area of the bearing housing (12') and a corresponding inner casing surface area of the turbine housing (14').

5. The connection assembly (30) according to claim 1, wherein the sealing arrangement (20') is arranged within a region that is defined by an axial extension of a connection device (16') interconnecting the bearing housing (12') and the turbine housing (14') in the axial direction of the bearing housing (12') and in the direction of the turbine housing (14').

6. The connection assembly (30) according to claim 5, wherein the connection device (16') comprises a clamp (16'), forming a V collar around adjacent sections of the turbine housing (14') and the bearing housing (12').

7. An exhaust gas turbocharger with a connection assembly (30) of a turbine housing (14') to a bearing housing (12') of an exhaust gas turbocharger, said turbine housing (14') and said bearing housing (12') being centered relative to each other and connected to each other by a connection joint (19') including a sealing assembly (20'), with a heat shield (18') disposed between said turbine housing (14') and said bearing housing (12'), the heat shield (18')having annularly spaced cutouts (42) for accommodating a centering shoulder section (21) with outer centering surfaces (32) of the bearing housing (12) extend, and the turbine housing (14) having a corresponding annular structure (15) with an inner surface in direct contact with the centering surfaces (32) of the shoulder sections (21) projecting axially through the annularly spaced cutouts (42) in the heat shield (18) thereby providing a centering arrangement via which the turbine housing (14') and the bearing housing (12') are in direct centering contact with one another.

\* \* \* \* \*